United States Patent
Sierra et al.

(10) Patent No.: US 11,863,671 B1
(45) Date of Patent: Jan. 2, 2024

(54) ACCESSORY ASSISTED ACCOUNT RECOVERY

(71) Applicant: Apple Inc., Cupertino, CA (US)

(72) Inventors: Yannick L. Sierra, San Francisco, CA (US); Lucia E. Ballard, San Francisco, CA (US); Kyle C. Brogle, San Francisco, CA (US); DJ Capelis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/848,591

(22) Filed: Apr. 14, 2020

Related U.S. Application Data

(60) Provisional application No. 62/835,234, filed on Apr. 17, 2019.

(51) Int. Cl.
*H04L 29/06* (2006.01)
*H04L 9/08* (2006.01)

(52) U.S. Cl.
CPC ............ *H04L 9/0894* (2013.01); *H04L 9/083* (2013.01); *H04L 9/0822* (2013.01); *H04L 9/0869* (2013.01)

(58) Field of Classification Search
CPC ... H04L 9/0894; H04L 9/0822; H04L 9/0897; H04L 9/083; H04L 9/0869; H04L 9/085
See application file for complete search history.

(56) References Cited

U.S. PATENT DOCUMENTS

| | | |
|---|---|---|
| 4,918,425 A | 4/1990 | Greenberg et al. |
| 5,910,776 A | 6/1999 | Black |
| 6,369,706 B1 | 4/2002 | Anderson et al. |
| 6,993,350 B2 | 1/2006 | Katoh |
| 7,039,427 B2 | 5/2006 | Tachikawa |
| 7,059,182 B1 | 6/2006 | Ragner |

(Continued)

FOREIGN PATENT DOCUMENTS

| | | |
|---|---|---|
| CN | 102325324 A | 1/2012 |
| CN | 106792501 A | 5/2017 |

(Continued)

OTHER PUBLICATIONS

Mannan, Mohammad, et al. "Mercury: Recovering forgotten passwords using personal devices." International Conference on Financial Cryptography and Data Security. Springer, Berlin, Heidelberg, 2011 (Year: 2011).*

(Continued)

*Primary Examiner* — Yogesh Paliwal
(74) *Attorney, Agent, or Firm* — Aikin & Gallant, LLP

(57) ABSTRACT

Embodiments described herein enable a user to bypass the use of one-time keys or account recovery codes by providing techniques for accessory assisted account recovery. In various embodiments, accessory assisted account recovery makes use of an accessory device of a user, where the accessory device can be any device having a secure processor, cryptographic engine, public key accelerator, or is otherwise able to accelerate cryptographic operations or perform cryptographic operations in a secure execution environment. An account recovery key can be split into multiple portions. At least one portion of the recovery key is then encrypted. The accessory device is then configured to be uniquely capable of decrypting the encrypted portion of an account recovery key.

26 Claims, 9 Drawing Sheets

(56) References Cited

U.S. PATENT DOCUMENTS

| | | | |
|---|---|---|---|
| 7,274,761 B2 | 9/2007 | Muller et al. | |
| 7,342,497 B2 | 3/2008 | Chung et al. | |
| 7,376,393 B2 | 5/2008 | Ono et al. | |
| 7,388,491 B2 | 6/2008 | Chand et al. | |
| 7,519,377 B2 | 4/2009 | Tsukamoto | |
| 7,558,529 B2 | 7/2009 | Seshadri et al. | |
| 8,213,389 B2 | 7/2012 | Bush et al. | |
| 8,538,401 B2 | 9/2013 | Kim et al. | |
| 8,583,915 B1 | 11/2013 | Huang | |
| 8,971,924 B2 | 3/2015 | Pai et al. | |
| 9,077,521 B2 | 7/2015 | Machani | |
| 9,104,896 B2 | 8/2015 | Pai et al. | |
| 9,277,386 B2 | 3/2016 | Masiero et al. | |
| 9,357,348 B2 | 5/2016 | Evans et al. | |
| 9,420,423 B1 | 8/2016 | Mendelson | |
| 9,426,749 B2 | 8/2016 | Cordeiro et al. | |
| 9,432,802 B2 | 8/2016 | Matsushita et al. | |
| 9,456,298 B2 | 9/2016 | Lee et al. | |
| 9,520,045 B2 | 12/2016 | Hawkins | |
| 9,544,075 B2 | 1/2017 | Altman et al. | |
| 9,565,255 B2 | 2/2017 | Kapoor et al. | |
| 9,641,622 B2 | 5/2017 | Kapoor et al. | |
| 9,706,032 B2 | 7/2017 | Pai et al. | |
| 9,762,316 B2 | 9/2017 | Kukuiski et al. | |
| 9,769,601 B2 | 9/2017 | Zelinka | |
| 9,779,596 B2 | 10/2017 | Ingrassia et al. | |
| 9,781,106 B1 | 10/2017 | Vitus et al. | |
| 9,801,059 B2 | 10/2017 | Ziv et al. | |
| 9,820,093 B2 | 11/2017 | Mayor et al. | |
| 9,848,075 B1 | 12/2017 | Ahmad et al. | |
| 9,860,932 B2 | 1/2018 | Kapoor et al. | |
| 9,922,531 B1 | 3/2018 | Doxey et al. | |
| 10,015,836 B2 | 7/2018 | Kapoor et al. | |
| 10,022,066 B2 | 7/2018 | Tomiha | |
| 10,022,086 B1 | 7/2018 | Kahn et al. | |
| 10,366,692 B1 | 7/2019 | Adams et al. | |
| 10,410,485 B2 | 9/2019 | Ingrassia et al. | |
| 10,448,211 B1 | 10/2019 | Shen et al. | |
| 10,506,517 B2 | 12/2019 | Dai Javad et al. | |
| 10,600,310 B2 | 3/2020 | Hawkins | |
| 10,667,313 B2 | 5/2020 | Maguire et al. | |
| 10,841,736 B1 | 11/2020 | De La Broise | |
| 10,855,483 B1 | 12/2020 | Ramesh et al. | |
| 10,862,684 B2 | 12/2020 | Hong et al. | |
| 10,970,989 B1 | 4/2021 | Quibelan et al. | |
| 10,992,755 B1 | 4/2021 | Tran | |
| 11,265,716 B2 | 3/2022 | Klinkner et al. | |
| 2003/0092437 A1 | 5/2003 | Nowlin et al. | |
| 2003/0182584 A1* | 9/2003 | Banes | G06F 21/34 713/182 |
| 2005/0021767 A1 | 1/2005 | Cai | |
| 2005/0154896 A1 | 7/2005 | Widman et al. | |
| 2005/0190098 A1 | 9/2005 | Bridgelall et al. | |
| 2005/0285739 A1 | 12/2005 | Velhal et al. | |
| 2006/0111835 A1 | 5/2006 | Baker et al. | |
| 2007/0139199 A1 | 6/2007 | Hanlon | |
| 2007/0249374 A1 | 10/2007 | Hu et al. | |
| 2008/0004798 A1 | 1/2008 | Troxler et al. | |
| 2008/0119953 A1 | 5/2008 | Reed et al. | |
| 2008/0120196 A1 | 5/2008 | Reed et al. | |
| 2009/0058670 A1 | 3/2009 | Sweeney et al. | |
| 2009/0150674 A1* | 6/2009 | Richardson | H04L 9/006 713/171 |
| 2009/0315767 A1 | 12/2009 | Scalisi et al. | |
| 2009/0325599 A1 | 12/2009 | Vuori | |
| 2010/0079249 A1 | 4/2010 | Pan | |
| 2010/0159833 A1 | 6/2010 | Lewis et al. | |
| 2010/0184378 A1 | 7/2010 | Wakefield | |
| 2010/0245054 A1 | 9/2010 | Kim | |
| 2010/0289620 A1 | 11/2010 | Aminger et al. | |
| 2011/0124326 A1 | 5/2011 | Kudo | |
| 2012/0054493 A1 | 3/2012 | Bradley | |
| 2012/0083209 A1 | 4/2012 | Giles et al. | |
| 2012/0310391 A1 | 12/2012 | Sanders | |
| 2012/0328061 A1 | 12/2012 | Chow | |
| 2013/0023238 A1 | 1/2013 | Kaplan et al. | |
| 2013/0111555 A1 | 5/2013 | Leneel | |
| 2013/0290191 A1 | 10/2013 | Dischamp et al. | |
| 2013/0290522 A1 | 10/2013 | Behm, Jr. | |
| 2014/0111307 A1 | 4/2014 | Ingrassia et al. | |
| 2014/0222685 A1 | 8/2014 | Middleton et al. | |
| 2015/0019124 A1 | 1/2015 | Bandyopadhyay et al. | |
| 2015/0072618 A1 | 3/2015 | Granbery | |
| 2015/0289207 A1 | 10/2015 | Kubo et al. | |
| 2015/0334569 A1 | 11/2015 | Rangarajan et al. | |
| 2015/0350140 A1 | 12/2015 | Garcia et al. | |
| 2015/0350820 A1 | 12/2015 | Son et al. | |
| 2016/0006577 A1 | 1/2016 | Logan | |
| 2016/0037439 A1 | 2/2016 | Shamis et al. | |
| 2016/0057625 A1 | 2/2016 | Andrada et al. | |
| 2016/0087959 A1 | 3/2016 | Park | |
| 2016/0094947 A1 | 3/2016 | Shen et al. | |
| 2016/0140335 A1* | 5/2016 | Proulx | H04L 63/083 726/6 |
| 2016/0017402 A1 | 6/2016 | Cavallaro et al. | |
| 2016/0164973 A1 | 6/2016 | Kapoor et al. | |
| 2016/0174023 A1 | 6/2016 | Cavallaro et al. | |
| 2016/0189507 A1 | 6/2016 | Rayner | |
| 2016/0205556 A1 | 7/2016 | Borghei | |
| 2016/0248564 A1 | 8/2016 | Qi et al. | |
| 2016/0344712 A1 | 11/2016 | Ding et al. | |
| 2016/0352518 A1* | 12/2016 | Ford | H04L 9/088 |
| 2016/0371507 A1 | 12/2016 | Jakobsson | |
| 2017/0126818 A1 | 5/2017 | Kang | |
| 2017/0228935 A1 | 8/2017 | Foster et al. | |
| 2017/0134898 A1 | 11/2017 | Vega et al. | |
| 2017/0325065 A1 | 11/2017 | Azam et al. | |
| 2017/0330031 A1 | 11/2017 | Wilson et al. | |
| 2018/0025595 A1 | 1/2018 | Ingrassia et al. | |
| 2018/0035374 A1 | 2/2018 | Borden et al. | |
| 2018/0176748 A1 | 6/2018 | Kim et al. | |
| 2018/0183591 A1 | 6/2018 | De Laat et al. | |
| 2018/0184286 A1 | 6/2018 | Patterson | |
| 2018/0219872 A1 | 8/2018 | Sugashima et al. | |
| 2018/0227284 A1 | 8/2018 | Sugano et al. | |
| 2018/0262907 A1 | 9/2018 | Alanis et al. | |
| 2018/0317266 A1 | 11/2018 | Britt et al. | |
| 2018/0343561 A1 | 11/2018 | Patterson | |
| 2019/0028281 A1* | 1/2019 | Turissini | G06F 21/57 |
| 2019/0037469 A1 | 1/2019 | Krishnan et al. | |
| 2019/0058966 A1 | 2/2019 | Puppala et al. | |
| 2019/0246253 A1 | 8/2019 | Ryu et al. | |
| 2019/0289059 A1 | 9/2019 | Vanahalli et al. | |
| 2020/0074822 A1 | 3/2020 | Ingrassia, Jr. et al. | |
| 2020/0107164 A1 | 4/2020 | Lopatin et al. | |
| 2020/0187001 A1 | 6/2020 | Ard et al. | |
| 2020/0226908 A1 | 7/2020 | Doxey et al. | |
| 2021/0136846 A1 | 5/2021 | Ponnusamy et al. | |
| 2021/0250355 A1 | 8/2021 | Galdo et al. | |
| 2021/0256833 A1 | 8/2021 | Daoura et al. | |
| 2021/0334851 A1 | 10/2021 | Proctor, Jr. et al. | |
| 2022/0078029 A1 | 3/2022 | Galdo et al. | |

FOREIGN PATENT DOCUMENTS

| | | |
|---|---|---|
| CN | 108223229 A | 6/2018 |
| EP | 2020784 | 2/2009 |
| GB | 2472192 A | 2/2011 |
| KR | 20140044916 | 4/2014 |
| KR | 20170013833 | 2/2017 |
| KR | 20180086118 | 7/2018 |
| KR | 2019-0141998 A | 12/2019 |
| WO | 2010126846 A1 | 11/2010 |
| WO | 2014005004 A1 | 3/2014 |
| WO | 2014042507 A1 | 3/2014 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018156555 | 8/2018 |
| WO | 2018160863 A1 | 9/2018 |
| WO | 2019232420 A2 | 12/2019 |
| WO | 2020214701 A1 | 10/2020 |

(56) References Cited

FOREIGN PATENT DOCUMENTS

| WO | 2020214708 A1 | 10/2020 |
| WO | 2020214709 A1 | 10/2020 |
| WO | 2020214711 A1 | 10/2020 |

OTHER PUBLICATIONS

A. Korolova et al., "Cross-App Tracking Via Nearby Bluetooth Low Energy Devices", A presentation proposal for PrivacyCon 2017, Published Mar. 13, 2018, 12 pgs.
FOFA, "Find One, Find All Key Finder & Remote Control Locators", received from The Wayback Machine—https://web.archive.org/web/20200715080402/http://www.findonefindall.com:80/index.htm, 3 pages.
Kim et al., "In/Out Status Monitoring in Mobile Asset Tracking with Wireless Sensor Networks", received from www.mdpi.com/journal/sensors, published Mar. 26, 2010, 22 pages.
Fuemmeler et al., "Energy Efficient Multi-Object Tracking in Sensor Networks", received from https://ieeexplore.ieee.org/document/5439914, published Mar. 29, 2010, 9 pages.
Cocchi et al., "Subband Neural Networks Prediction for On-Line Audio Signal Recovery", received from https://ieeexplore.ieee.org/document/1021887, Published Jul. 2002, 10 pages.
PCT/US2022/027681, "PCT Notification of transmittal of the International Search Report and the Written Opinion of the International Searching Authority, or the Declaration", dated Jul. 28, 2022, 9 pages.
EP22172663.1, "Extended European Search Report" dated Jan. 25, 2023, 18 pages.

\* cited by examiner

ACCESSORY ASSISTED ACCOUNT RECOVERY

CROSS-REFERENCE

This application claims priority to U.S. Provisional Application Ser. No. 62/835,234, filed on Apr. 17, 2019, which is hereby incorporated herein by reference.

TECHNICAL FIELD

This disclosure relates generally to electronic devices. More specifically, this disclosure relates to a system and associated methods to enable user account recovery using an accessory device.

BACKGROUND

Many users of computing devices have multiple accounts that require the user to provide one or more credentials to gain access to them. Because of this, it is quite common for one person to have multiple passwords for multiple different accounts. With the increasing number of passwords, users typically forget the passwords that they use for their different accounts. Various types of account recovery techniques can be used to enable a user to recover an account with a forgotten password. Some techniques make use of a recovery key or passcode that is previously generated by the user or provided to the user. Other techniques may make use of a one-time key or code that is generated in real time and provided to the user via an out-of-band communication channel.

SUMMARY

Embodiments described herein enable a user to bypass the use of one-time keys or account recovery codes by providing techniques for accessory assisted account recovery. In various embodiments, accessory assisted account recovery makes use of an accessory device of a user, where the accessory device can be any device having a secure processor, cryptographic engine, public key accelerator, or is otherwise able to accelerate cryptographic operations or perform cryptographic operations in a secure execution environment.

One embodiment provides for an electronic device comprising a memory coupled with the network interface and at least one application processor coupled with the memory, the at least one processor to execute instructions stored in the memory, wherein the at least one application processor is to split an account recovery key into multiple key portions, wherein the account recovery key is to enable recovery of an account associated with the electronic device, receive an encryption key from an accessory device associated with the electronic device, encrypt a portion of the account recovery key using cryptographic material derived from the encryption key, and provide an encrypted portion of the account recovery key to a server associated with the user account.

One embodiment provides for a method comprising, at an accessory device having a processor and memory, the accessory device to facilitate recovery of a user account, receiving a first randomized value, generating a second randomized value, computing a cryptographic seed based on the first randomized value and the second randomized value, the cryptographic seed for use in generating a key pair for use in encrypting a portion of an account recovery key, and storing the cryptographic seed to storage on the accessory device.

One embodiment provides for a non-transitory machine-readable medium storing instructions to cause one or more processors on an electronic device to perform operations comprising receiving an encrypted portion of an account recovery key, wherein the encrypted portion of the account recovery key is a first portion of the account recovery key, transmitting the encrypted portion of the account recovery key to an accessory device associated with the electronic device, receiving the first portion of the account recovery key from the accessory device, the first portion of the account recovery key having been decrypted from the encrypted portion of the account recovery key, and generating the account recovery key using at least the first portion of the account recovery key.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
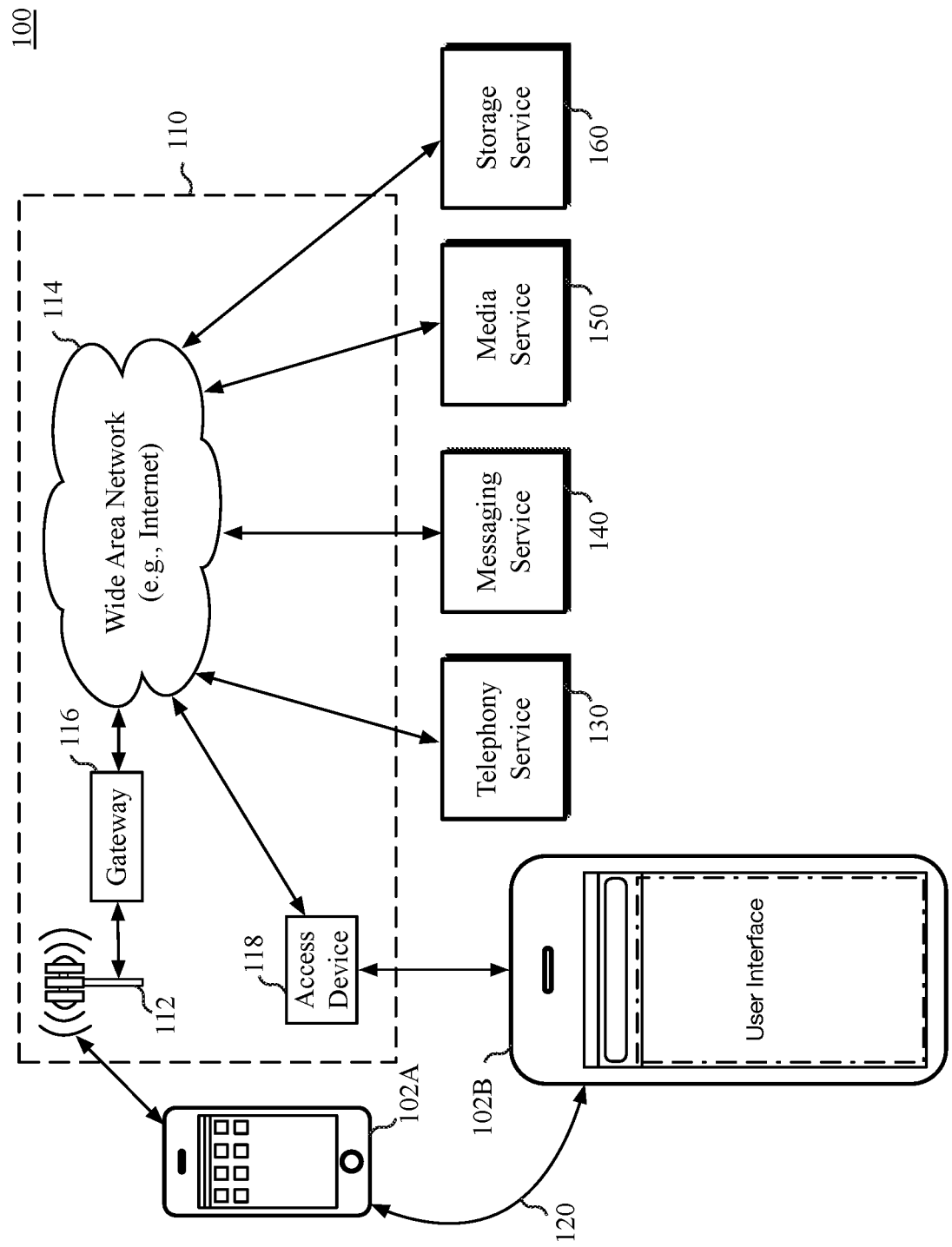
FIG. 1 is a block diagram of an example network operating environment for mobile devices, according to an embodiment.

Should a user lose access to or forget the account credentials used to access the network services and storage, an account recovery process may be used to recover the account credentials. Embodiments described herein enable a user to bypass the use of one-time keys or account recovery codes by providing techniques for accessory assisted account recovery. In various embodiments, accessory assisted account recovery makes use of an accessory device of a user, where the accessory device can be any device having a secure processor, cryptographic engine, public key accelerator, or is otherwise able to accelerate cryptographic operations or perform cryptographic operations in a secure execution environment.

The accessory device can be configured to be uniquely capable of decrypting a portion of a recovery key. The encrypted portion of the recovery key can be held in escrow for the user within an online or cloud storage container to which a cloud service provider has access. Although the cloud service provider has access to the encrypted portion of the recovery key, the cloud service provider will not hold the keys used to decrypt the encrypted portion. Instead, upon authentication with the cloud service provider via an alternate mechanism than the lost or inaccessible account credentials which the user is attempting to recover, the cloud service provider can provide the encrypted recovery key portion to a user device of the user, which can decrypt the encrypted recovery key portion on behalf of the user device and enabled the user device to combine the portions of the account recovery key to recover the account recovery key. The account recovery key can then be used by the user device to recover access to one or more user accounts.

Data associated with a user account may be stored in encrypted containers to which the account provider does not have access, as the account provider may not retain the keys used to decrypt those containers. The account recovery technique described herein enables a user to recover access to a user account without giving the provider access to the recovered encrypted data of the account. This technique differs from hardware-based signature generators or token devices that allow a user to prove themselves to a provider in order to recover lost account credentials, as such mechanisms do not allow the user to recover a secret to which the provider does not have access.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and Apple Watch® devices from Apple Computer, Inc. of Cupertino, California.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2018 Apple Inc.

In the discussion that follows, a computing device that includes a touch-sensitive display is described. It should be understood, however, that the computing device may include one or more other physical user-interface devices, such as a separate display, physical keyboard, a mouse, and/or a joystick. Electronic devices described herein support a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

A user account as described herein can be a device specific account, an online server or services account, and/or a device specific account that is linked with an online account. Example services that can be accessed via an online account described herein are shown in FIG. 1 and FIG. 2 below.

Figure 2:
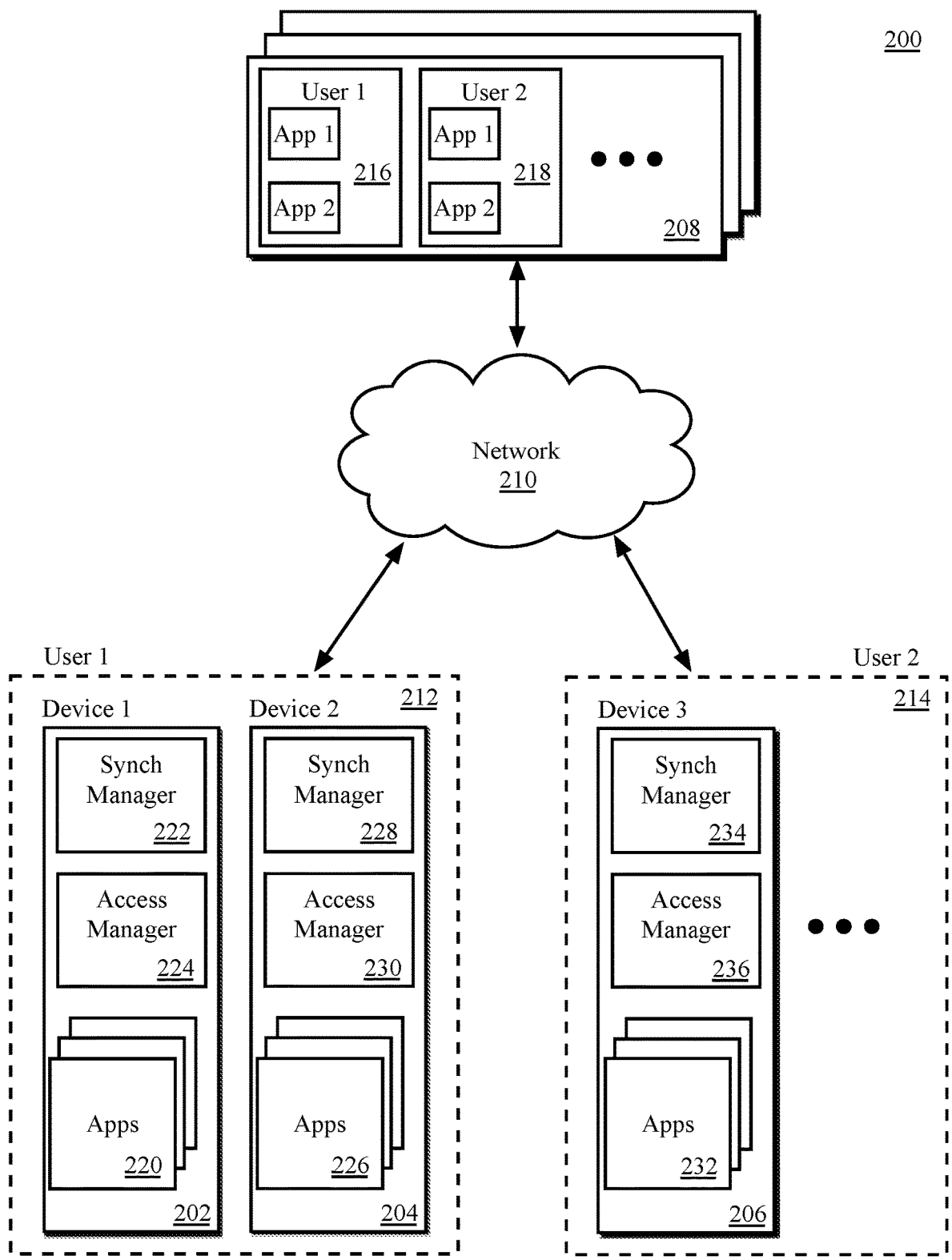
FIG. 2 is a diagram illustrating a system for securely storing data items for synchronization and exchange, according to an embodiment.

FIG. 1 is a block diagram of an example network operating environment 100 for mobile devices, according to an embodiment. Mobile device 102A and mobile device 102B can, for example, communicate over one or more wired and/or wireless networks 110 to perform data communication. For example, a wireless network 112, e.g., a cellular network, can communicate with a wide area network (WAN) 114, such as the Internet, by use of a gateway 116. Likewise, an access device 118, such as a mobile hotspot wireless access device, can provide communication access to the wide area network 114.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, and a storage service 160 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. A storage service 160 can provide network storage capabilities to mobile device 102A and mobile device 102B to store documents and media files. Other services can also be provided, including a software update service to update operating system software or client software on the mobile devices. In one embodiment, the messaging service 140, media service 150, and storage service 160 can each be associated with a cloud service provider.

FIG. 2 is a diagram illustrating a system 200 for securely storing data items for synchronization and exchange, according to an embodiment. The system 200 includes a first device 202, a second device 204, a third device 206, and a remote storage location 208. The first device 202, second device 204, third device 206, and remote storage location 208 are communicatively coupled together using one or more networks 210. The one or more networks 210 can include both wired and wireless networks. The network 210 can be, for example, part of a local area network, wide area network, or the Internet.

The first device 202, the second device 204, and the third device 206 can include, for example, desktop or laptop computing devices, mobile devices, tablet devices, personal data assistants, wearable devices, television or television set top boxes, smart speaker devices, or other computing devices. In particular, each of the first device 202 and the second device 204 can be associated with a first user or user account 212. Similarly, the third device 206, and one or more other devices not shown can be associated with a second user or user account 214. The remote storage location 208 can additionally be coupled to many other devices, not shown, that are associated with one or more different users or different user accounts.

In one embodiment the devices can be associated with the respective users or user accounts by forming an association between a unique or quasi-unique device key or device identifier for each device with a unique or quasi-unique account key or account identifier for each account. For example, a key or device identifier for the first device 202 and second device 204 can be associated with a key or account identifier for user or user account 212. A key or device identifier for the third device 206 can be associated with a key or user account identifier for user or user account 214. Such association can be used to enable authenticated access to account-based storage on the remote storage location 208. Unique keys or identifiers may be guaranteed to be unique by the use of a central account authority, while a quasi-unique key or identifier may be, for example, a universally unique identifier (UUID) or a globally unique identifier (QUID) that is mathematically likely to be unique.

The remote storage location 208 can be a single storage location or multiple storage locations. For example, a server, a network addressed storage location, a collection of computing devices, or as part of a cloud storage system presenting virtualized network storage. The remote storage location 208 includes separate logical containers for storing data from different users/user accounts and application combinations. In some examples, a logical container could be a directory in a file system, a data structure, a database, or another kind of data organizational unit. For example, the first user or user account 212 can have containers 216 on the remote storage location 208, one for each individual application associated with the user or user account. Similarly, the second user or user account 214 can have containers 218 for respective applications. Application data items received from individual devices (e.g., the first device 202) are stored in respective containers for that application. Depending on the intended usage, some containers 216, 218 can be encrypted using encryption keys that that are held only by the user or user accounts 212, 214, while other containers can be encrypted using keys that are held by the provider of the remote storage location 208. The remote storage location 208 can include a storage manager that can create and manage containers as well as generate notifications for devices.

The first device 202 includes one or more applications 220, a data synchronization manager 222, and an access manager 224. The one or more applications 220 can include various types of applications such as productivity applications, system applications, games, etc. Each application can be associated with a unique key or other identifier that can be used to identify the application and to identify particular access permissions of that application. In some implementations, one or more applications 220 are sandboxed such that each application is isolated from each other application.

The data synchronization manager 222 manages sending data items to the remote storage location 208 and receiving information (e.g., data items or notifications) from the remote storage location 208. The access manager 224 presents available data items to particular applications of the applications 220 in response to a query from the respective applications. The access manager 224 applies one or more access policies to determine what data items will be visible to a particular application of the applications 220. In some embodiments the data synchronization manager 222 and the access manager 224 can reside in the form of logic instructions in the memory that are executable on one or more of the processors of the electronic devices. In one embodiment the data synchronization manager 222 and access manager 236 can also be implemented as logic executable on an embedded microcontroller within the first device 202.

The second device 204 similarly includes one or more applications 226, a synchronization manager 228, and an access manager 230. The applications 220 and application 226 can include one or more of the same applications. The third device 206 similarly includes one or more applications 232, a synchronization manager 234, and an access manager 236. The illustrated elements of the second device 204 and third device 206 can function in a manner similar to the elements described with respect to the first device 202.

Access to the network services and storage mechanism illustrated in FIG. 1 and FIG. 2 can be gated by account credentials of an online or device account associated with the services and storage servers. A user can recover access to such accounts and associated data using accessory assisted recovery techniques described below.

Figure 3A:
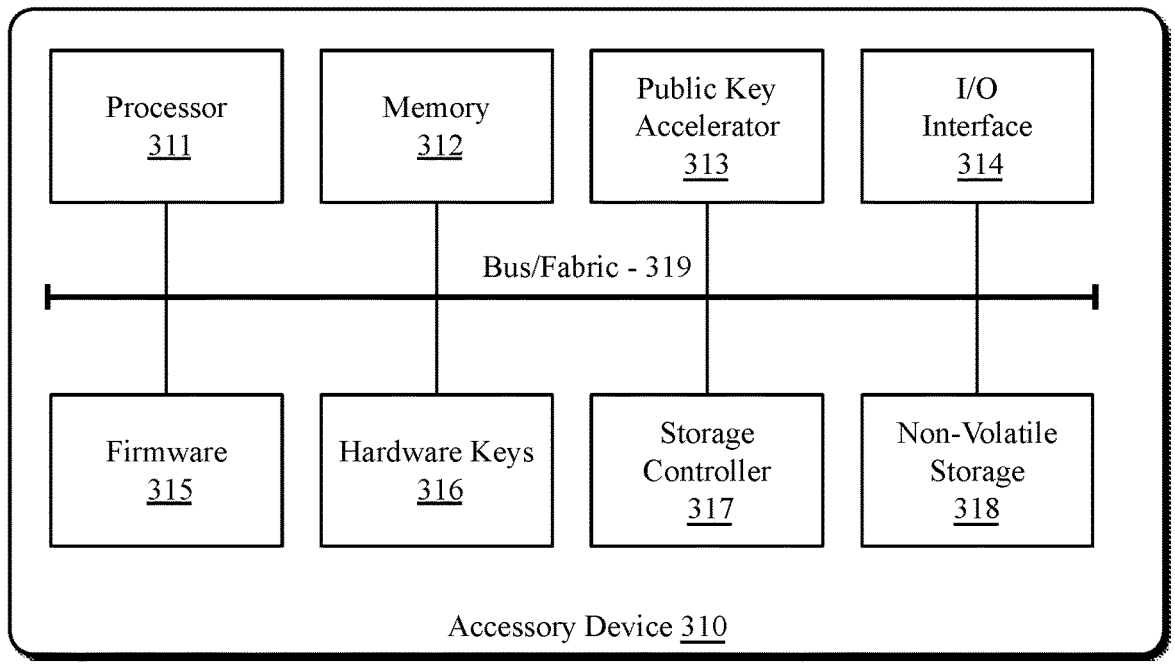
FIG. 3A-3B illustrate an accessory device and a primary device, according to embodiments.
Figure 3B:
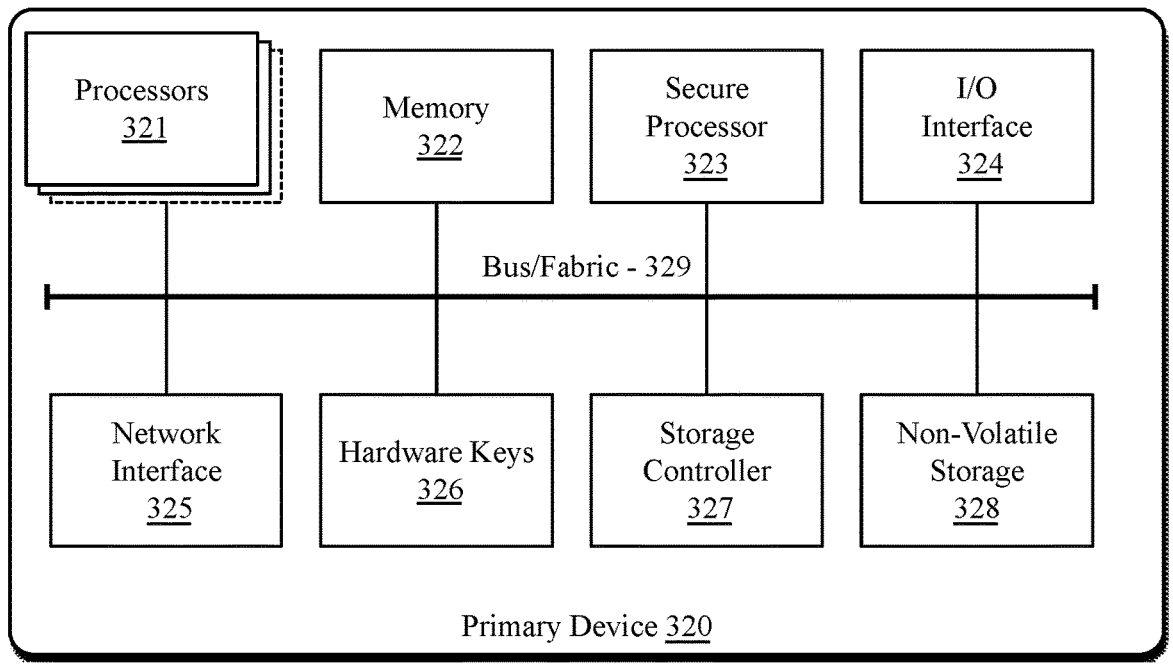

FIG. 3A-3B illustrate an accessory device 310 and a primary device 320, according to embodiments. FIG. 3A illustrates an accessory device 310 that can be used to assist account recovery. FIG. 3B illustrates a primary device 320 that can be used to recover a user account and keys, including one or more keys not available to the account provider. The accessory device 310 can be any wired or wireless accessory or secondary device described herein, such as wireless headphones, a smart power delivery device, an storage accessory, such as a detachable storage device, a Bluetooth beacon, a near-field communication (NFC) tag, a media player, a secondary smartphone or tablet device, or any other accessory device having a secure processor or, at the least, a public key accelerator, cryptographic engine, and/or a storage device having an onboard encryption or key accelerator. The primary device 320 can be, for example a smart phone device or smart computing device having a secure processor and secured or encrypted storage.

As shown in FIG. 3A, in one embodiment an accessory device 310 includes a processor 311, memory 312, a public key accelerator 313, an I/O interface 314, firmware 315, one or more hardware keys 316, a storage controller 317, and non-volatile storage 318. In various embodiments, other components that are not shown may also be included. The components of the accessory device 310 can be communicatively coupled via a bus or interconnect fabric 319. The bandwidth and throughput of the bus or interconnect fabric 319 can vary based on the complexity of the accessory device 310.

The processor 311 can be one of a variety of processors, from a low power processor for low power accessory devices, to general-purpose application processors, where the accessory device is a full-featured computing device. In various embodiments, the processor 311 can support one or more of a variety of instruction set architectures. In one embodiment, the processor can be a microcontroller. The memory 312 can be random-access memory that stores instructions for execution by the processor.

The public key accelerator 313 can be an application specific integrated circuit that is configured to perform public key acceleration operations described herein. In one embodiment the public key accelerator 313 has an associated chip identifier and attestation key that is registered with a manufacturer of the accessory device 310. In one embodiment, the public key accelerator 313 includes hardware logic to accelerate public key operations such as Diffie-Hellman operations, including elliptic-curve Diffie-Hellman operations. In some embodiments, the public key accelerator 313 can be replaced with a secure processor that includes more advanced cryptographic acceleration functionality. The I/O interface 314 can be or include a wired and/or a wireless interface. For example, the I/O interface 314 can include or couple with a universal serial bus (USB) controller and one or more USB connectors. The I/O interface 314 can also include or couple with one or more network interfaces, which can include one or more wired (e.g., Ethernet) or wireless (e.g., Bluetooth, Wi-Fi) interfaces.

In one embodiment the accessory device 310 includes firmware 315, which includes a store of instructions that are executed by the processor 311. In one embodiment the firmware 315 is updatable. The firmware 315 can be used to control low level functionality of the accessory device 310 and, in one embodiment, enable some high-level operations of the accessory device 310.

The accessory device 310 can additionally include one or more hardware keys 316, which may be stored in immutable memory that is separate from the non-volatile storage 318 of the accessory device 310. For example, in one embodiment the hardware keys 316 may be stored in a programmable read only memory (PROM), although other types of memory may be used. In one embodiment, one or more of the hardware keys 316 may be stored in non-volatile storage 318 and encrypted by a cryptographic engine within the storage controller 317 or within a secure processor within the accessory device. One or more of the hardware keys 316 can be used to verify the authenticity or to enable attestation of the accessory device 310. In one embodiment an attestation server is provided by the vendor of the accessory device to enable firmware of software on the accessory device 310 and primary device 320 to determine that the accessory device 310 is a genuine accessory device that is provided by the purported vendor of the accessory device.

As shown in FIG. 3B, the primary device 320 can include components that are similar to those of the accessory device 310, although the components of the primary device 320 may be higher power and/or higher performance components. The primary device 320 can include one or more processors 321, memory 322, a secure processor 323, an I/O interface 324, a network interface 325, one or more hardware keys 326, a storage controller 327, and non-volatile storage 328. The components of the accessory device 310 can be communicatively coupled via a bus or interconnect fabric 329, which may be of significantly higher bandwidth and throughput than the bus or interconnect fabric 319 of the accessory device 310.

In one embodiment the one or more processors 321 of the primary device 320 may be multi-core processors, or processors having a heterogenous micro-architecture or instruction set architecture. For example, the processors 321 can include one or more high-performance cores that operate in conjunction with one or more high-efficiency cores. Additionally, the one or more processors 321 can be graphics processors, sensor processors, neural network processors, or other types of processors that can be used to perform or accelerate operations on the primary device. The memory 322 can store instructions that are executed by the one or more processors 321. The memory can be random access memory (RAM) having one of a variety of memory designs.

The secure processor 323 can be one of a variety of different types of secure processors that provide an execution environment that is separate from the execution environment of the one or more processors 321 that are used to execute general-purpose application instructions on the primary device 320. For example, in one embodiment the secure processor 323 is a secure enclave processor (SEP), although other types of secure processors and/or secure or trusted processors or execution environments may be used.

The primary device 320 can have a separate I/O interface 324 and network interface 325, although additional network interfaces may be connected with the I/O interface 324. The I/O interface 324 can be a wired interface, such as a USB interface having one or more USB connectors. The network interface can include network processors and physical layer interfaces to enable the primary device to communicate over one or more wired or wireless networks, such as Ethernet, Wi-Fi, Bluetooth, NFC, etc.). The primary device 320 and the accessory device 310 can communicate and exchange data using corresponding I/O and/or network interfaces.

In one embodiment, the primary device 320 can include one or more hardware keys 326, which may be stored in immutable memory that is separate from the non-volatile storage 328 of the accessory device 310. For example, in one embodiment the hardware keys 326 may be stored in PROM. In one embodiment, one or more of the hardware keys 326 may be stored in non-volatile storage 328 and encrypted by a cryptographic engine within the secure processor 323 and/or storage controller 327. In one embodiment, one or more of the hardware keys 326 can be used to verify or attest to the validity and authenticity of the accessory device 310 to determine that the accessory device 310 is a genuine accessory device that is provided by the purported vendor of the accessory device.

Figure 4:
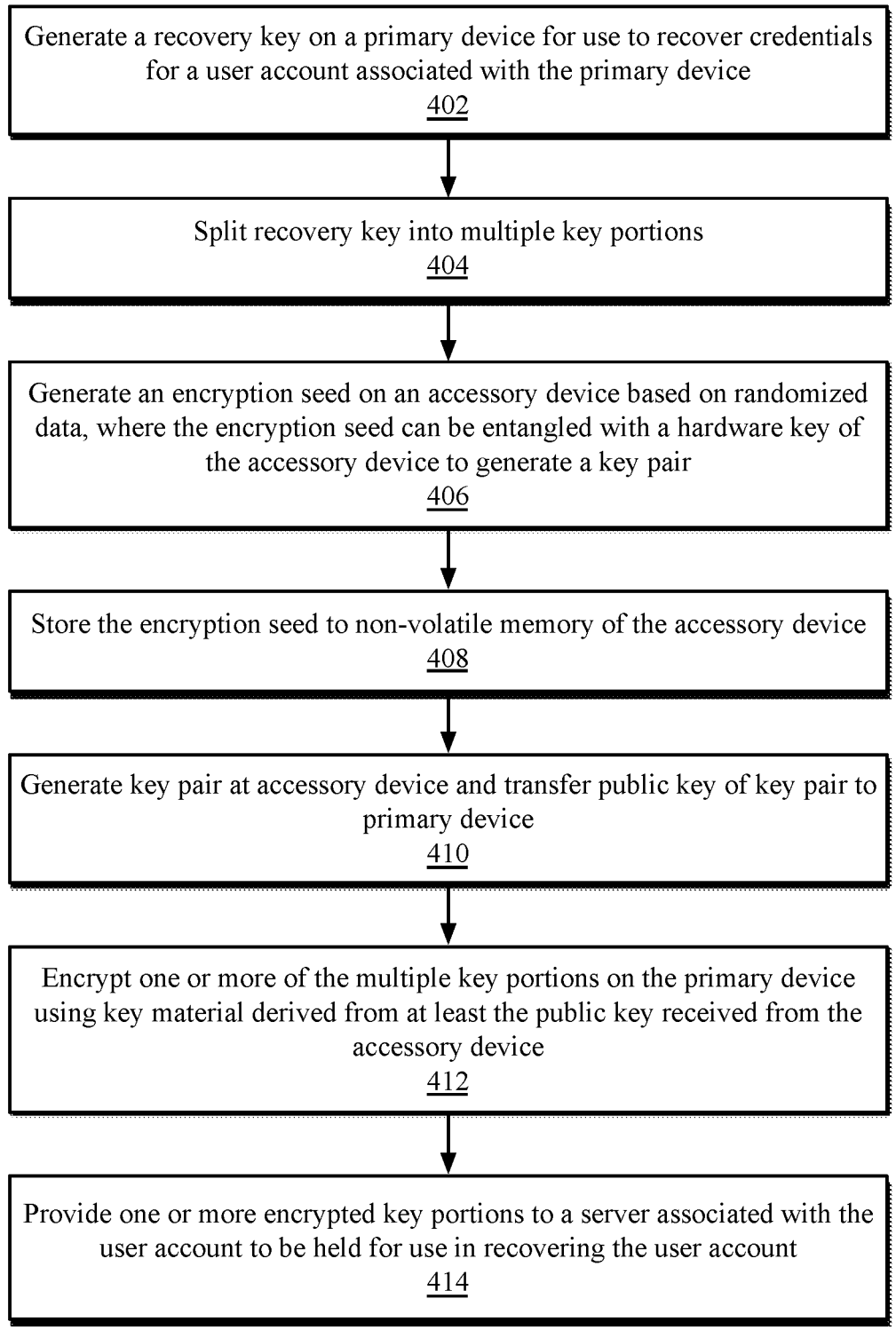
FIG. 4 illustrates a method of accessory assisted account recovery setup, according to an embodiment.

FIG. 4 illustrates a method of enabling accessory assisted account recovery setup, according to an embodiment. In one embodiment, an accessory device can be configured to be uniquely capable of decrypting one or more portions of a split recovery key. One or more encrypted portions of the recovery key can be held in escrow for the user within an online or cloud storage container to which a cloud service provider has access. In one embodiment the method of FIG. 4 can be jointly implemented by a primary device 320 and an accessory device 310 shown in FIG. 3A-3B.

In one embodiment the primary device can generate a recovery key on a primary device for use to recover credentials for a user account associated with the primary device (block 402). Alternatively, the primary device can receive a recovery key RK that was generated by another device. In one embodiment the recovery key can be generated by a server associated with an online service for which the user account is associated.

The primary device can then split the generated or received recovery key RK into multiple portions (block 404). In one embodiment the primary device can perform a key split on RK to split RK into two secrets, RK1 and RK2, such that RK=F (RK1, RK2). Function F may be a logical operation, for example, RK=RK1⊕RK2 is used in one embodiment. In other embodiments, function F is a more complex function or cryptographic operation. Knowledge of either RK1 or RK2 alone does not allow a user or attacker to recover RK. Instead, both RK1 and RK2 are provided to function F to generate a correct RK. While two key portions will be described, embodiments are not limited to any specific number of key portions.

Accessory assisted account recovery setup can then continue at an accessory device, with the accessory device generating a hardware key pair. The accessory device can generate an encryption seed on an accessory device based on randomized data, where the encryption seed can be entangled with a hardware key of the accessory device to generate a key pair (block 406). To generate the encryption seed, firmware on the accessory device can use a random number generator on the accessory device to generate a random secret (RS). The random secret RS can be combined with an optional randomized recovery value (RR), which can be provided by the primary device, to compute an $EC_{seed}$, where $EC_{seed}$=KDF (RR, RS) and KDF is a key derivation function. The $EC_{seed}$ can be cryptographically entangled with a private device key that is unique to the accessory device, such as a private hardware key for the device, to produce a key pair $\{d_{RK}, P_{RK}\}$.

Public key $P_{RK}$ can be signed by the device attestation key. The device attestation key is a device specific key that is associated with a chip ID of the accessory device and/or the public key accelerator on the accessory device. Tying in the attested key of the device provides a cryptographic mechanism to secure the recovery key system against attacks via unauthorized or counterfeit devices. Attestation for a device can be enabled using an attestation key pair for the device that is associated with and/or tied to a chip identifier for the accessory device during assembly or factory provisioning. A private hardware key for the device can be stored in fused memory on the device, such as a PROM. The public attestation key can be stored to an attestation server for use during attestation. The public attestation key may also be stored on the accessory device.

In one embodiment, during initial setup, $EC_{seed}$ is generated and stored in non-volatile memory of the accessory device (block 408). The key pair $\{d_{RK}, P_{RK}\}$ may be generated dynamically when needed, with public key $P_{RK}$ being signed by the device attestation key before being transmitted off of the accessory device. When the key pair $\{d_{RK}, P_{RK}\}$ is generated dynamically when needed, key revocation at the accessory device can be performed by erasing the $EC_{seed}$.

The accessory device can generate a key pair based on the $EC_{seed}$ and transfer public key $P_{RK}$ of the key pair to primary device (block 410). When public key $P_{RK}$ is signed, the primary device can validate the signature of $P_{RK}$ to verify the authenticity of the accessory device. In one embodiment, the primary device can communicate with an attestation server to confirm the authenticity of $P_{RK}$ to confirm that the accessory device is genuine.

The primary device can then encrypt one or more of multiple key portions using key material derived from at least the public key (e.g., $P_{RK}$) received from the accessory device (block 412). In one embodiment, the primary device can apply one or more of multiple possible encryption schemes to encrypt recovery key RK1 using $P_{RK}$ to generate $C_{RK1}$. Although other encryption schemes may be applied, in some embodiments an elliptic curve integrated encryption scheme (ECIES) is used. In one embodiment, encryption proceeds as follows. The primary device can generate an ephemeral key pair $\{e, P_e\}$. The primary device can then compute Z=ECDH(e, $P_{RK}$), where ECDH is an elliptic curve Diffie-Hellman key agreement protocol. The primary device also computes K=KDF(Z, $P_e$). The cryptographic value K and recovery key portion RK1 can be provided to an authenticated encryption protocol to generate cryptographic values $C_e$, $T_e$, such that $C_e$, $T_e$=AE(K, RK). Ciphertext $C_{RK1}$ can then be generated, such that $C_{RK1}$={$P_e$, $C_e$, $T_e$}.

In one embodiment the primary device can then provide one or more encrypted key portions to a server associated with the user account to be held for use in recovering the user account (block 414). For example, the primary device can store ciphertext $C_{RK1}$ and recovery key portion RK2 in a data storage container, which can be an encrypted cloud-based storage container that may be accessed by the cloud storage provider. The storage container can be synchronized with a server of the cloud storage provider. The cloud storage provider can then store ciphertext $C_{RK1}$ and recovery key portion RK2 in escrow for the user until and unless account recovery is required.

Figure 5:
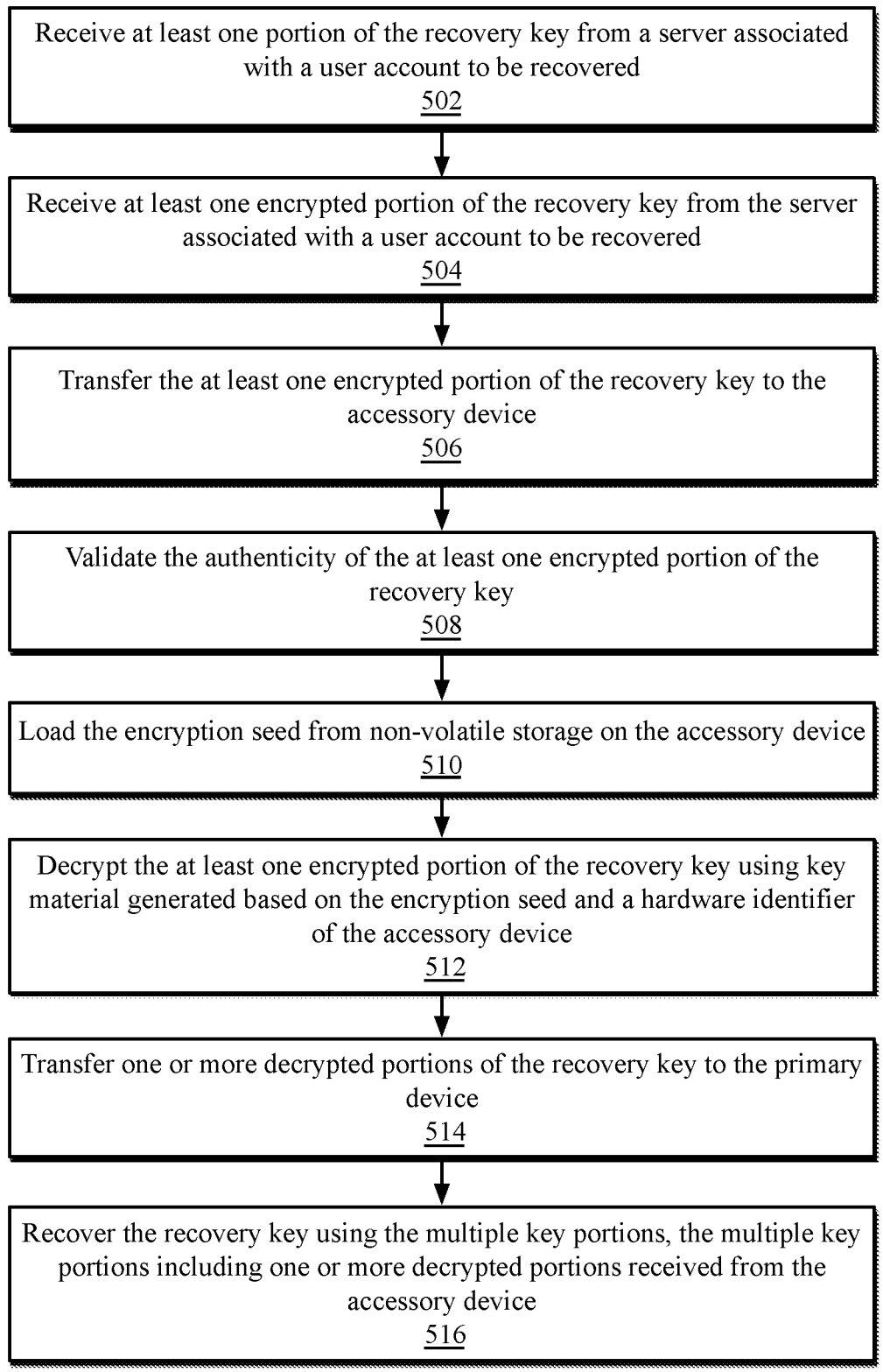
FIG. 5 illustrates a method of performing accessory assisted account recovery, according to an embodiment.

FIG. 5 illustrates a method of performing accessory assisted account recovery, according to an embodiment. In one embodiment, the accessory device, having previously been configured with an $EC_{seed}$, can be used to decrypt one or more portions of a split recovery key that have been held in escrow for the user within an online or cloud storage container to which a cloud service provider has access. In one embodiment the method of FIG. 5 can be jointly implemented by a primary device 320 and an accessory device 310 shown in FIG. 3A-3B.

In one embodiment, the method of FIG. 5 can include for a primary device to receive at least one portion of the recovery key from a server associated with a user account to be recovered (block 502). The primary device can also receive at least one encrypted portion of the recovery key from the server associated with a user account to be recovered (block 504). For example, primary device can receive RK2 and $C_{RK1}$ from a server that was holding those keys in escrow for the user. In one embodiment the primary device can receive the keys via a cloud storage container that is synchronized with the server.

Before the primary device receives either of RK2 or $C_{RK1}$ from the server, the user may be requested or required to perform some action or operation on or with the accessory device to demonstrate possession of the accessory device and an intent to perform an account recovery. In one embodiment, the action can be tapping the accessory device to the primary device to initiate a data transfer via near-field communication (NFC). Other actions or operations can also be performed in other embodiments, such as a physical button press or a selection of an element on a graphical user interface presented on the accessory device. In one embodiment, during the actions or operation performed on or with the accessory device, a nonce can be selected by the accessory device and transmitted to the cloud service provider. The cloud service provider can then sign one or more of $C_{RK1}$ and RK2 using a key or certificate associated with the cloud service provider and/or the accessory device selected nonce before providing $C_{RK1}$ and RK2.

The primary device can transfer the at least one encrypted portion of the recovery key to the accessory device (block 506). For example, in one embodiment the primary device can receive $C_{RK1}$ and RK2 and then transmit $C_{RK1}$ to the accessory device. In one embodiment, the cloud service provider can transmit $C_{RK1}$ directly to the wireless accessory when the wireless accessory can establish a data connection to the cloud service provider. The accessory device and the primary device can communicate via a data channel. The data channel can be a wired or wireless communication channel. For example, the accessory device can be connected to the primary device via a USB connector. The accessory device can additionally or alternatively communicate with the primary device via one or more wireless communication protocols (e.g., Bluetooth, Wi-Fi, NFC).

The accessory device can then validate the authenticity of the at least one encrypted portion of the recovery key (block 508). For example, the accessory device, having received $C_{RK1}$ can validate a signature applied to $C_{RK1}$ to determine that $C_{RK1}$ was legitimately provided by the cloud service provider and/or is legitimately associated with the accessory device. If the signature is valid, the accessory device can proceed to decrypt $C_{RK1}$. The decryption process can include for the accessory device to load the encryption seed from non-volatile storage on the accessory device (block 510). The accessory device can load the $EC_{seed}$ stored on the accessory device into the public key accelerator of the accessory device. The public key accelerator can then compute Z=ECDH($d_{RK}$, $P_e$). Firmware on the accessory device can compute K=KDF(Z, $P_e$).

The accessory device can then decrypt the at least one encrypted portion of the recovery key using key material generated based on the encryption seed and a hardware identifier of the accessory device (block 512). For example, in one embodiment, the accessory device can perform an authenticated decryption operation to recover RK1, such that RK1=AE (K, $C_e$, $T_e$).

The accessory device can then transfer one or more decrypted portions of the recovery key to the primary device (block 514). For example, the recovery key portion RK1 can be provided to the primary device. The primary device can then recover the recovery key using the multiple key portions, the multiple key portions including one or more decrypted portions received from the accessory device (block 516). For example, the primary device can recover the account recovery key RK, where RK=F (RK1, RK2). The primary device can then use recovery key RK to reset or recover account credentials associated with the user account. The primary device can then send confirmation of successful account recovery to the accessory device. The accessory device, upon receiving confirmation of successful account recovery, can erase the locally stored $EC_{seed}$. In one embodiment, to enable subsequent account recovery, a new RK can be generated and split, as the old keys cannot be reused. If revocation is to be performed prior to use of a generated and split RK, the accessory device can erase the locally stored $EC_{seed}$ and the cloud service provider can erase one of more of the stored $C_{RK1}$ or RK2 from the cloud storage container that is held by the cloud service provider.

Figure 6:
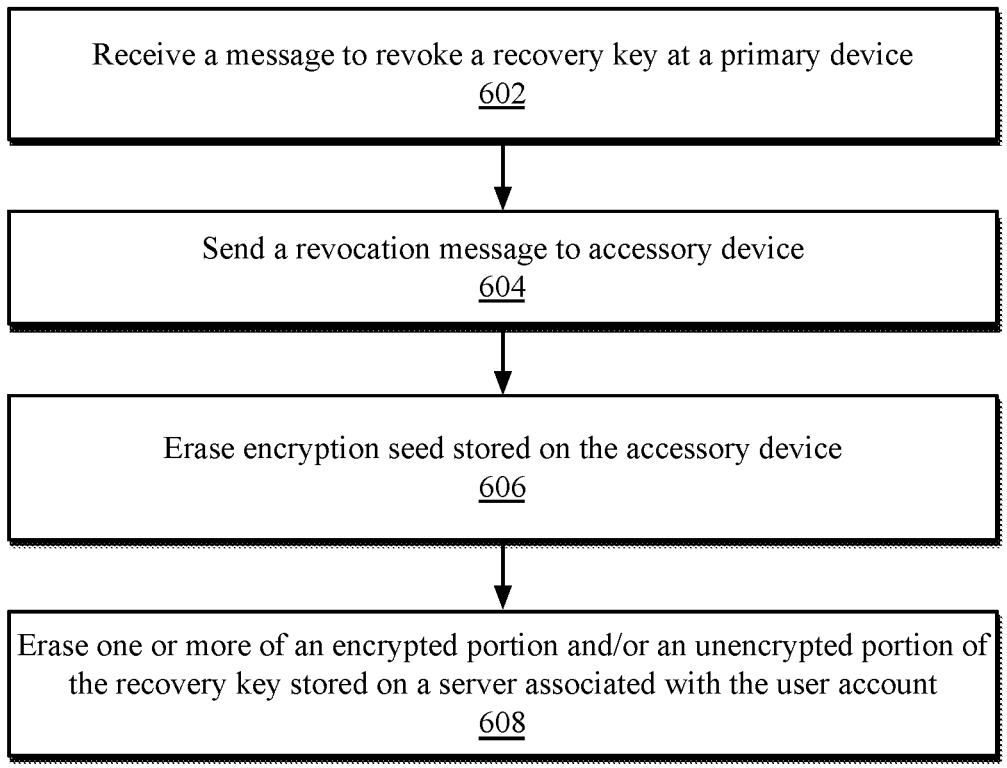
FIG. 6 illustrates a method of revoking a recovery key used for accessory assisted recovery, according to an embodiment.

FIG. 6 illustrates a method of revoking a recovery key used for accessory assisted recovery, according to an embodiment. Revocation of a recovery key can occur after a successful recovery or upon a demonstration of user intent to discard existing recovery data.

In one embodiment, a primary device can receive a message to revoke a recovery key (block 602). The primary device can send a revocation message to accessory device (block 604). The accessory device can then erase the encryption seed (e.g., $EC_{seed}$) stored on the accessory device (block 606). Additionally, the primary device can request to erase one or more of an encrypted portion and/or an unencrypted portion of the recovery key stored on a server associated with the user account (block 608). For example, erasing either $C_{RK1}$ or RK2 from the cloud storage container that is held by the cloud service provider can prevent the recovery of the user account using the existing set of credentials. The user may then re-create new recovery keys to re-enable accessory assistant recovery.

Figure 7:
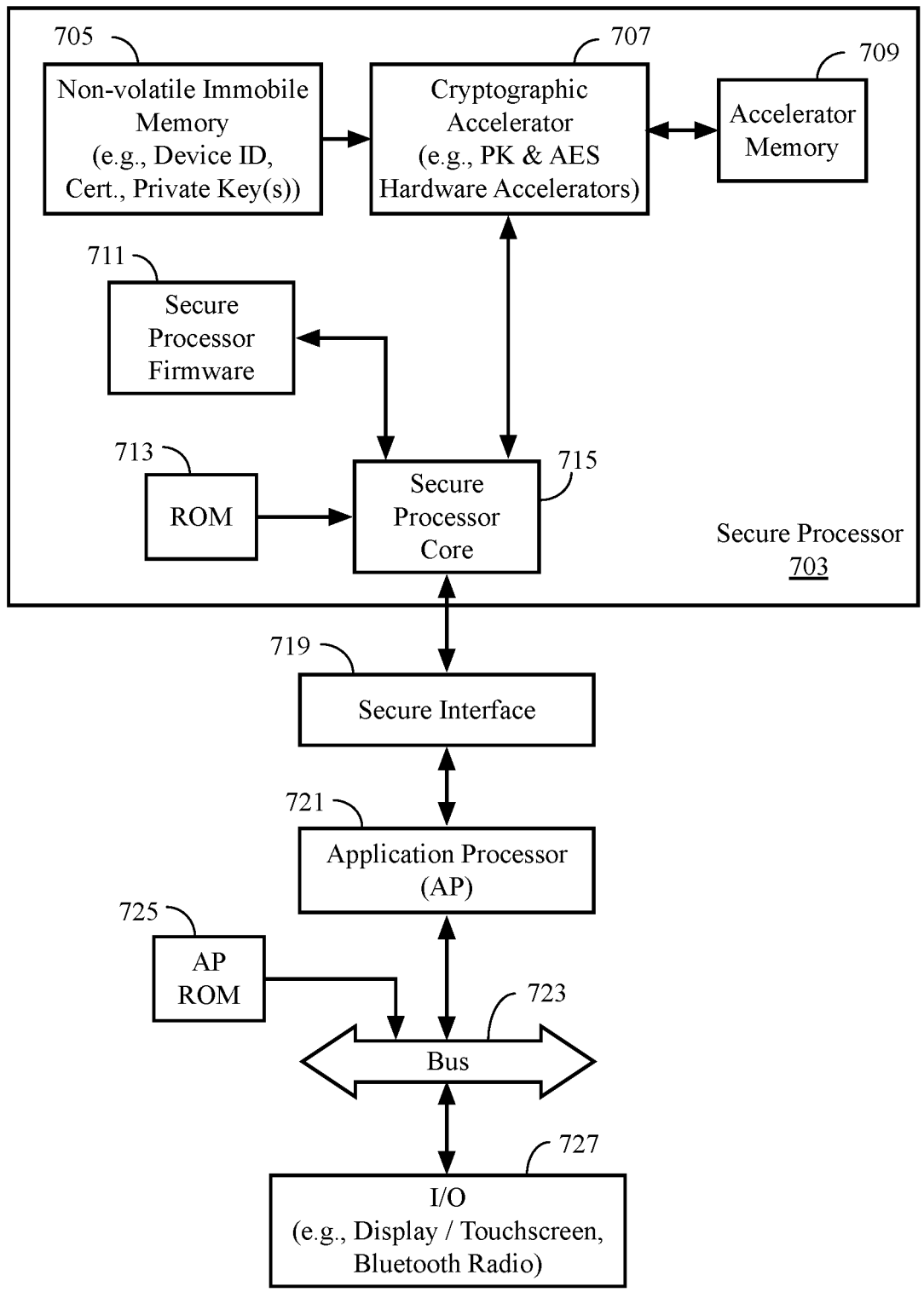
FIG. 7 illustrates a computing system including a secure processor, according to an embodiment.

FIG. 7 illustrates a computing system 700 including a secure processor, according to an embodiment. The illustrated secure processor is a secure enclave processor, although other types of secure processors may be used by embodiments described herein. The computing system 700 can enable a device to perform secure accelerated cryptographic operations and provide secure storage for private keys. The computing system 700 includes an application processor 721 that is communicably coupled with a secure processor 703 via a secure interface 719. The computing system 700 can be a portion of any of the client devices described herein. Additionally, the computing system 700 can be included into one or more of the servers described herein. In one embodiment, the secure processor 703 can be implemented as a system on chip. In another embodiment, the application processor 721 and the secure processor 703 can be implemented on a system on chip and include one or more processors and memory controllers and other components on a single integrated circuit.

The secure processor 703 can perform cryptographic operations as described herein, as well as other system security operations such as encrypting user files or verifying code signatures, processing user passcodes, or performing other security operations. The cryptographic operations can be performed in part by the secure processor core 715 by executing software stored as firmware 711 in the secure processor 703. The secure processor 715 can also be coupled to a secure ROM 713 which can be trusted software that can validate the software in the firmware 711 before allowing that firmware to execute by checking a code signature of the firmware and verifying that the signature code indicates that the firmware is valid and has not been corrupted before allowing the firmware to be executed by the secure processor core 715.

The secure processor 703 can also include a cryptographic accelerator such as cryptographic accelerator 707 which can perform asymmetric cryptography as well as symmetric cryptography using a hardware accelerator. The cryptographic accelerator 707 can be coupled to memory 705, which in one embodiment is non-volatile and immutable memory that can store, in a secure manner, a device identifier or a set of device identifiers and a set of one or more certificates and private keys which are not readable by the rest of the system. The cryptographic accelerator 707 has access to the private keys and other data within the memory 705 and access to the memory 705 is not allowed for components outside of the secure processor 703. In one embodiment, the cryptographic accelerator 707 can be coupled to an accelerator memory 709 which can be a scratch pad memory used to perform the cryptographic operations that are performed by the cryptographic accelerator 707. The application processor 721 can be coupled to one or more buses 723 which are coupled to one or more input and output (I/O) devices 727, such as a touchscreen display and a Bluetooth radio, etc. Other input and output devices can be included. The application processor 721 is also coupled to an application processor ROM 725, which provides software to boot up the application processor. Similarly, the secure ROM 713 provides code to boot up the secure processor core 715.

Figure 8:
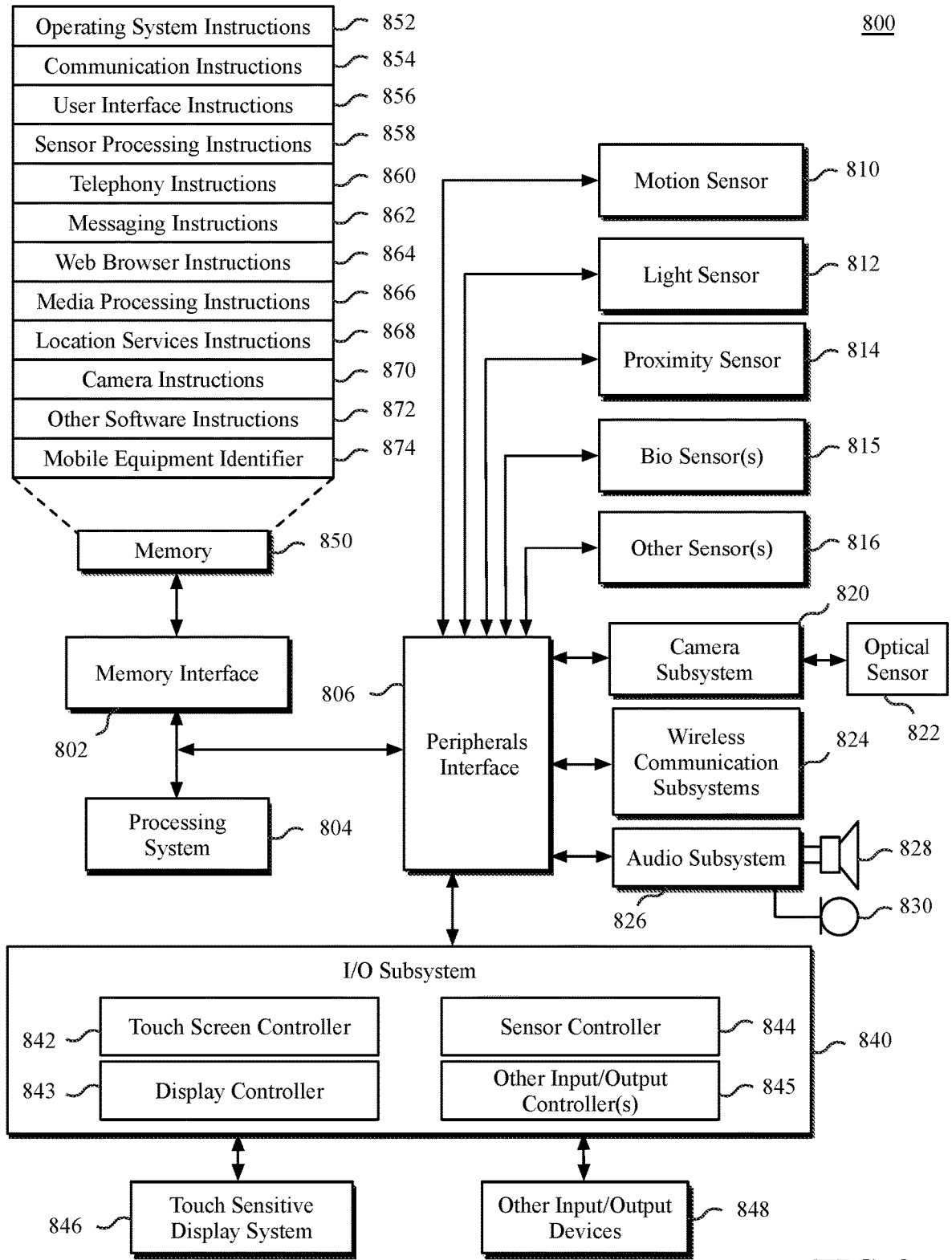
FIG. 8 is a block diagram of a device architecture for a mobile or embedded device, according to an embodiment.

FIG. 8 is a block diagram of a device architecture 800 for a mobile or embedded device, according to an embodiment. The device architecture 800 includes a memory interface 802, a processing system 804 including one or more data processors, image processors and/or graphics processing units, and a peripherals interface 806. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The various components can be coupled by one or more communication buses or signal lines. The various components can be separate logical components or devices or can be integrated in one or more integrated circuits, such as in a system on a chip integrated circuit. The memory interface 802 can be coupled to memory 850, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate the mobile device functionality. One or more biometric sensor(s) 815 may also be present, such as a fingerprint scanner for fingerprint recognition or an image sensor for facial recognition. Other sensors 816 can also be connected to the peripherals interface 806, such as a positioning system (e.g., GPS receiver), a temperature sensor, or other sensing device, to facilitate related functionalities. A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters that can be configured receive or transmit data packets and/or data streams from a remote source. The specific design and implementation of the wireless communication subsystems 824 can depend on the communication network(s) over which a mobile device is intended to operate. For example, a mobile device including the illustrated device architecture 800 can include wireless communication subsystems 824 designed to operate over a GSM network, a CDMA network, an LTE network, a Wi-Fi network, a Bluetooth network, or any other wireless network. In particular, the wireless communication subsystems 824 can provide a communications mechanism over which a media playback application can retrieve resources from a remote media server or scheduled events from a remote calendar or event server.

An audio subsystem 826 can be coupled to a speaker 828 and a microphone 830 to facilitate voice-enabled functions, such as voice recognition, voice replication, digital recording, and telephony functions. In smart media devices described herein, the audio subsystem 826 can be a high-quality audio system including support for virtual surround sound.

The I/O subsystem 840 can include a touch screen controller 842 and/or other input controller(s) 845. For computing devices including a display device, the touch screen controller 842 can be coupled to a touch sensitive display system 846 (e.g., touch-screen). The touch sensitive display system 846 and touch screen controller 842 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 846. Display output for the touch sensitive display system 846 can be generated by a display controller 843. In one embodiment, the display controller 843 can provide frame data to the touch sensitive display system 846 at a variable frame rate.

In one embodiment, a sensor controller 844 is included to monitor, control, and/or processes data received from one or more of the motion sensor 810, light sensor 812, proximity sensor 814, or other sensors 816. The sensor controller 844 can include logic to interpret sensor data to determine the occurrence of one of more motion events or activities by analysis of the sensor data from the sensors.

In one embodiment, the I/O subsystem 840 includes other input controller(s) 845 that can be coupled to other input/control devices 848, such as one or more buttons, rocker switches, thumb-wheel, infrared port, USB port, and/or a pointer device such as a stylus, or control devices such as an up/down button for volume control of the speaker 828 and/or the microphone 830.

In one embodiment, the memory 850 coupled to the memory interface 802 can store instructions for an operating system 852, including portable operating system interface (POSIX) compliant and non-compliant operating system or an embedded operating system. The operating system 852 may include instructions for handling basic system services and for performing hardware dependent tasks. In some implementations, the operating system 852 can be a kernel.

The memory 850 can also store communication instructions 854 to facilitate communicating with one or more additional devices, one or more computers and/or one or more servers, for example, to retrieve web resources from remote web servers. The memory 850 can also include user interface instructions 856, including graphical user interface instructions to facilitate graphic user interface processing.

Additionally, the memory 850 can store sensor processing instructions 858 to facilitate sensor-related processing and functions; telephony instructions 860 to facilitate telephone-related processes and functions; messaging instructions 862 to facilitate electronic-messaging related processes and functions; web browser instructions 864 to facilitate web browsing-related processes and functions; media processing instructions 866 to facilitate media processing-related processes and functions; location services instructions including GPS and/or navigation instructions 868 and Wi-Fi based location instructions to facilitate location based functionality; camera instructions 870 to facilitate camera-related processes and functions; and/or other software instructions 872 to facilitate other processes and functions, e.g., security processes and functions, and processes and functions related to the systems. The memory 850 may also store other software instructions such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. A mobile equipment identifier, such as an International Mobile Equipment Identity (MEI) 874 or a similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions may be implemented in hardware and/or in software, including in one or more signal processing and/or application specific integrated circuits.

Figure 9:
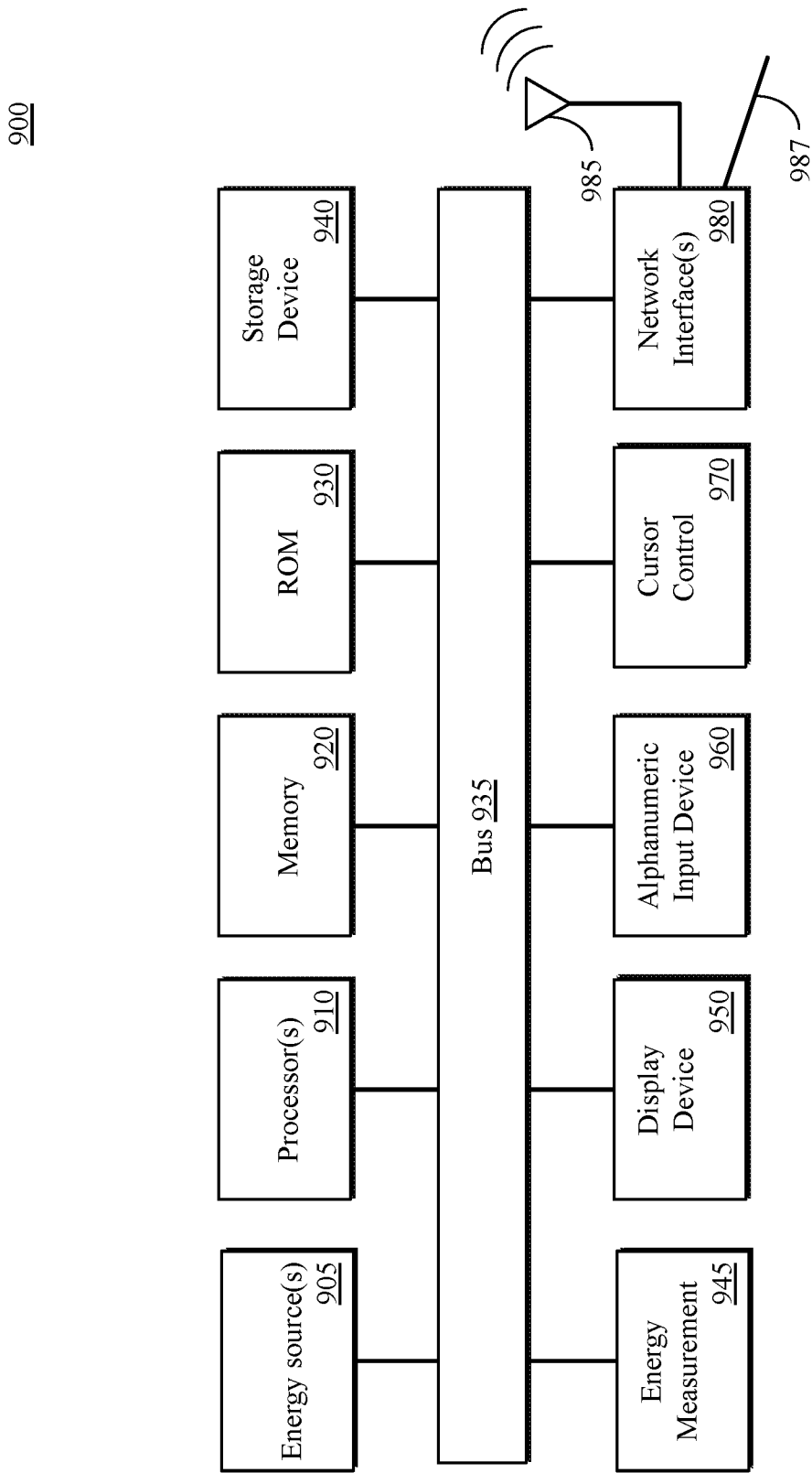
FIG. 9 is a block diagram of a computing system, according to an embodiment.

FIG. 9 is a block diagram of a computing system 900, according to an embodiment. The illustrated computing system 900 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 900 can be used to provide the computing device and/or a server device to which the computing device may connect.

The computing system 900 includes bus 935 or other communication device to communicate information, and processor(s) 910 coupled to bus 935 that may process information. While the computing system 900 is illustrated with a single processor, the computing system 900 may include multiple processors and/or co-processors. The computing system 900 further may include memory 920, which can be random-access memory (RAM) or other dynamic storage device coupled to the bus 935. The memory 920 may store information and instructions that may be executed by processor(s) 910. The memory 920 may also be used to store temporary variables or other intermediate information during execution of instructions by the processor(s) 910.

The computing system 900 may also include read only memory (ROM) 930 and/or another data storage device 940 coupled to the bus 935 that may store information and instructions for the processor(s) 910. The data storage device 940 can be or include a variety of storage devices, such as a flash memory device, a magnetic disk, or an optical disc and may be coupled to computing system 900 via the bus 935 or via a remote peripheral interface.

The computing system 900 may also be coupled, via the bus 935, to a display device 950 to display information to a user. The computing system 900 can also include an alpha-numeric input device 960, including alphanumeric and other keys, which may be coupled to bus 935 to communicate information and command selections to processor(s) 910. Another type of user input device includes a cursor control 970 device, such as a touchpad, a mouse, a trackball, or cursor direction keys to communicate direction information and command selections to processor(s) 910 and to control cursor movement on the display device 950. The computing system 900 may also receive user input from a remote device that is communicatively coupled via one or more network interface(s) 980.

The computing system 900 further may include one or more network interface(s) 980 to provide access to a network, such as a local area network. The network interface(s) 980 may include, for example, a wireless network interface having antenna 985, which may represent one or more antenna(e). The computing system 900 can include multiple wireless network interfaces such as a combination of Bluetooth®, near field communication (NFC), and/or cellular telephony interfaces. The network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, the network interface(s) 980 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 900 can further include one or more energy sources 905 and one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing system 900 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein enable a user to bypass the use of one-time keys or account recovery codes by providing techniques for accessory assisted account recovery. In various embodiments, accessory assisted account recovery makes use of an accessory device of a user, where the accessory device can be any device having a secure processor, cryptographic engine, public key accelerator, or is otherwise able to accelerate cryptographic operations or perform cryptographic operations in a secure execution environment.

One embodiment provides for an electronic device comprising a memory coupled with the network interface and at least one application processor coupled with the memory, the at least one processor to execute instructions stored in the memory, wherein the at least one application processor is to split an account recovery key into multiple key portions, wherein the account recovery key is to enable recovery of an account associated with the electronic device, receive an encryption key from an accessory device associated with the electronic device, encrypt a portion of the account recovery key using cryptographic material derived from the encryption key, and provide an encrypted portion of the account recovery key to a server associated with the user account.

One embodiment provides for a method comprising, at an accessory device having a processor and memory, the accessory device to facilitate recovery of a user account, receiving a first randomized value, generating a second randomized value, computing a cryptographic seed based on the first randomized value and the second randomized value, the cryptographic seed for use in generating a key pair for use in encrypting a portion of an account recovery key, and storing the cryptographic seed to storage on the accessory device.

One embodiment provides for a non-transitory machine-readable medium storing instructions to cause one or more processors on an electronic device to perform operations comprising receiving an encrypted portion of an account recovery key, wherein the encrypted portion of the account recovery key is a first portion of the account recovery key, transmitting the encrypted portion of the account recovery key to an accessory device associated with the electronic device, receiving the first portion of the account recovery key from the accessory device, the first portion of the account recovery key having been decrypted from the encrypted portion of the account recovery key, and generating the account recovery key using at least the first portion of the account recovery key.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:
1. An electronic device, comprising:
a memory to store instructions; and
at least one application processor coupled with the memory, the at least one application processor to execute instructions stored in the memory, wherein the at least one application processor is to:
split an account recovery key into multiple key portions, wherein the account recovery key is to enable recovery of an account associated with the electronic device;
receive an encryption key from an accessory device associated with the electronic device, wherein the encryption key is signed with an attestation key;
verify authenticity of the accessory device with the signed encryption key;
encrypt a portion of the account recovery key using cryptographic material derived from the encryption key, wherein encrypting the portion of the account recovery key includes to:
generate an ephemeral key pair;
compute a first portion of the cryptographic material based in part on a first key of the ephemeral key pair and the encryption key;
compute a second portion of the cryptographic material based in part on a second key of the ephemeral key pair and the first portion of the cryptographic material; and
encrypt the portion of the account recovery key using the second portion
of the cryptographic material; and
provide an encrypted portion of the account recovery key to a server associated with a user account associated with the electronic device.

2. The electronic device as in claim 1, wherein the encrypted portion of the account recovery key provided to the server is to be used to recover credentials associated with the user account.

3. The electronic device as in claim 1, wherein the encryption key received from the accessory device is a public key derived by the accessory device.

4. The electronic device as in claim 3, the at least one application processor to provide randomized data to the accessory device to enable the accessory device to derive the public key.

5. The electronic device as in claim 1, wherein the multiple key portions of the account recovery key include a first key portion and a second key portion and the at least one application processor is to encrypt the first key portion.

6. The electronic device as in claim 5, wherein to encrypt the portion of the account recovery key includes to perform an encryption operation on the first key portion.

7. The electronic device as in claim 1, wherein to provide the encrypted portion of the account recovery key to the server associated with the user account includes to store the encrypted portion of the account recovery key to the encrypted cloud storage container that is synced with the server via a network interface.

8. The electronic device as in claim 7, wherein the server is capable of decrypting the encrypted cloud storage container.

9. The electronic device as in claim 7, the at least one application processor is additionally to provide a second portion of the multiple key portions to the server.

10. A non-transitory machine-readable medium storing instructions to cause one or more processors on an electronic device to perform operations comprising:
receiving, at an accessory device, an encrypted portion of an account recovery key, wherein the encrypted portion of the account recovery key is a first portion of the account recovery key;
transmitting, to a primary device, the first portion of the account recovery key from the accessory device, the first portion of the account recovery key having been decrypted from the encrypted portion of the account recovery key, wherein decrypting the first portion of the account recovery key includes:
computing a first portion of the cryptographic material based in part on a first key of an ephemeral key pair and the encryption key;
computing a second portion of the cryptographic material based in part on a second key of the ephemeral key pair and the first portion of the cryptographic material; and
encrypting the portion of the account recovery key using the second portion of the cryptographic material.

11. The non-transitory machine-readable medium as in claim 10, the operations additionally comprising receiving the encrypted portion of the account recovery key and the second portion of the account recovery key from a server, wherein the server is associated with an account having credentials or data which the account recovery key is used to recover.

12. The non-transitory machine-readable medium as in claim 10, the operations additionally comprising transmitting a confirmation to the accessory device after recovering the account on the electronic device.

13. The method comprising:
splitting an account recovery key into multiple key portions, wherein the account recovery key is to enable recovery of an account associated with the electronic device;
receiving an encryption key from an accessory device associated with the electronic device, wherein the encryption key is signed with an attestation key;
verifying authenticity of the accessory device with the signed encryption key;
encrypting a portion of the account recovery key using cryptographic material derived from the encryption key, wherein the encrypting the portion of the account recovery key includes to:
generating an ephemeral key pair;
computing a first portion of the cryptographic material based in part on a first key of the ephemeral key pair and the encryption key;
computing a second portion of the cryptographic material based in part on a second key of the ephemeral key pair and the first portion of the cryptographic material; and
encrypting the portion of the account recovery key using the second portion of the cryptographic material; and
providing an encrypted portion of the account recovery key to a server associated with a user account associated with the electronic device.

14. The method as in claim 13, wherein the encrypted portion of the account recovery key provided to the server is to be used to recover credentials associated with the user account.

15. The method as in claim 13, wherein the encryption key received from the accessory device is a public key derived by the accessory device.

16. The method as in claim 15, the at least one application processor to provide randomized data to the accessory device to enable the accessory device to derive the public key.

17. The method as in claim 13, wherein the multiple key portions of the account recovery key include a first key portion and a second key portion and the at least one application processor is to encrypt the first key portion.

18. The method as in claim 17, wherein to encrypt the portion of the account recovery key includes to perform an encryption operation on the first key portion.

19. The method as in claim 13, wherein to provide the encrypted portion of the account recovery key to the server associated with the user account includes to store the encrypted portion of the account recovery key to the encrypted cloud storage container that is synced with the server via a network interface.

20. The method as in claim 19, wherein the server is capable of decrypting the encrypted cloud storage container.

21. The method as in claim 19, the at least one application processor is additionally to provide a second portion of the multiple key portions to the server.

22. A non-transitory machine-readable medium storing instructions to cause one or more processors on an electronic device to perform operations comprising:
- splitting an account recovery key into multiple key portions, wherein the account recovery key is to enable recovery of an account associated with the electronic device;
- receiving an encryption key from an accessory device associated with the electronic device, wherein the encryption key is signed with an attestation key;
- verifying authenticity of the accessory device with the signed encryption key;
- encrypting a portion of the account recovery key using cryptographic material derived from the encryption key, wherein the encrypting the portion of the account recovery key includes to:
- generating an ephemeral key pair;
- computing a first portion of the cryptographic material based in part on a first key of the ephemeral key pair and the encryption key;
- computing a second portion of the cryptographic material based in part on a second key of the ephemeral key pair and the first portion of the cryptographic material; and
- encrypting the portion of the account recovery key using the second portion of the cryptographic material; and
- providing an encrypted portion of the account recovery key to a server associated with a user account associated with the electronic device.

23. The non-transitory machine-readable medium as in claim 22, wherein the encrypted portion of the account recovery key provided to the server is to be used to recover credentials associated with the user account.

24. The non-transitory machine-readable medium as in claim 22, wherein the encryption key received from the accessory device is a public key derived by the accessory device.

25. The non-transitory machine-readable medium as in claim 22, the at least one application processor to provide randomized data to the accessory device to enable the accessory device to derive the public key.

26. The non-transitory machine-readable medium as in claim 22, wherein the multiple key portions of the account recovery key include a first key portion and a second key portion and the at least one application processor is to encrypt the first key portion.

* * * * *